United States Patent
Stark et al.

(10) Patent No.: US 10,398,073 B2
(45) Date of Patent: Sep. 3, 2019

(54) DISK DEVICE FOR AN AGRICULTURAL MACHINE

(71) Applicant: VÄDERSTAD-VERKEN AB, Väderstad (SE)

(72) Inventors: Crister Stark, Väderstad (SE); Mikael Edvinsson, Boxholm (SE)

(73) Assignee: VÄDERSTAD-VERKEN AB, Väderstad (SE)

( * ) Notice: Subject to any disclaimer, the term of this patent is extended or adjusted under 35 U.S.C. 154(b) by 380 days.

(21) Appl. No.: 14/770,723

(22) PCT Filed: Mar. 7, 2014

(86) PCT No.: PCT/SE2014/050281
§ 371 (c)(1),
(2) Date: Aug. 26, 2015

(87) PCT Pub. No.: WO2014/137281
PCT Pub. Date: Sep. 12, 2014

(65) Prior Publication Data
US 2016/0014951 A1    Jan. 21, 2016

(30) Foreign Application Priority Data
Mar. 8, 2013   (SE) ..................... 1350280

(51) Int. Cl.
*A01B 35/28* (2006.01)
*A01B 23/06* (2006.01)
(Continued)

(52) U.S. Cl.
CPC ................ *A01B 35/28* (2013.01); *A01B 5/00* (2013.01); *A01B 7/00* (2013.01); *A01B 15/16* (2013.01);
(Continued)

(58) Field of Classification Search
CPC .......... A01B 23/06; A01B 15/16; A01B 35/28
(Continued)

(56) References Cited

U.S. PATENT DOCUMENTS 570,828 A * 11/1896 Tracy ........................ B02C 1/10
                                                            172/555
1,076,745 A * 10/1913 Ciccolini ............... A01B 41/04
                                                            172/108
(Continued)

FOREIGN PATENT DOCUMENTS

EP    1 182 920 B1    9/2003
EP    2 140 747 A2    1/2010
(Continued)

OTHER PUBLICATIONS

European Search Report for Application No. 14761118.0 dated Oct. 20, 2016.

*Primary Examiner* — Thomas B Will
*Assistant Examiner* — Joel F. Mitchell
(74) *Attorney, Agent, or Firm* — Birch, Stewart, Kolasch & Birch, LLP (57) ABSTRACT

A disc device for an agricultural machine includes at least one disc implement, an arm, at one end of which the implement is journalled in bearings at an axle, and a bearing, which is arranged at the opposite end of the arm and is adapted to be fastened at a transverse beam on the frame of the agricultural machine. The disc device includes in the circumference direction of the disc implement mainly equally distributed, freestanding, out towards the periphery radially extending, protruding parts, wherein each protruding part has an outer edge, which extends in the range 15-75 degrees in relation to the plane of the disc implement.

18 Claims, 6 Drawing Sheets

(51) Int. Cl.
*A01B 7/00* (2006.01)
*A01B 15/16* (2006.01)
*A01B 15/18* (2006.01)
*A01B 21/08* (2006.01)
*A01B 5/00* (2006.01)
*A01B 29/04* (2006.01)

(52) U.S. Cl.
CPC .............. *A01B 15/18* (2013.01); *A01B 21/08* (2013.01); *A01B 21/086* (2013.01); *A01B 23/06* (2013.01); *A01B 29/04* (2013.01)

(58) Field of Classification Search
USPC .................................................. 172/604, 555
See application file for complete search history.

(56) References Cited

U.S. PATENT DOCUMENTS

| | | | |
|---|---|---|---|
| RE13,885 E * | 2/1915 | Kramer | 172/556 |
| 1,331,200 A * | 2/1920 | Hoefen | A01B 33/103 172/532 |
| 1,585,839 A | 5/1926 | Ernst | |
| 1,880,584 A | 10/1932 | Tibbitts | |
| 2,196,857 A * | 4/1940 | Frechtling et al. | A01B 21/04 172/555 |
| 2,596,527 A * | 5/1952 | Bushong | A01B 33/103 172/555 |
| 2,599,843 A | 6/1952 | Knutzen | |
| 2,654,982 A | 10/1953 | Edwards | |
| 3,233,686 A * | 2/1966 | Steadman | A01B 33/021 172/119 |
| 4,047,576 A * | 9/1977 | Rau et al. | A01B 29/041 172/120 |
| 4,759,411 A * | 7/1988 | Williamson | A01B 15/18 172/572 |
| 6,102,132 A * | 8/2000 | Schimke | A01B 15/18 111/139 |
| 6,158,523 A * | 12/2000 | Gengler et al. | A01B 15/18 172/572 |
| 6,412,571 B1 * | 7/2002 | McIlhargey | A01B 61/046 172/572 |
| 2002/0038620 A1 * | 4/2002 | Gentilhomme | A01B 23/06 111/166 |

FOREIGN PATENT DOCUMENTS

SE 535 710 C2 11/2012
WO WO 2012/093958 A1 7/2012

* cited by examiner

DISK DEVICE FOR AN AGRICULTURAL MACHINE

The invention refers to a disc device for an agricultural machine according to the pre-characterising portion of claim 1.

TECHNICAL AREA

Obliquely positioned discs in various forms have been used in agricultural machines for a long time. One approach is to use obliquely positioned conical discs mounted in a frame with parallel beams. They are mounted on individual arms which are suspended in separate rubber cushionings (see for example EP 1 182 920). This design of work implement is very effective as regards soil cultivation, particularly at working depths down to approx. 10 cm. The disc cuts up the soil, slices off roots and simultaneously breaks up the soil effectively. However, this disc is not particularly effective in efficiently breaking up harvest residues, for example after oilseeds, but also after maize or other crops. The farmer often wants to have the harvest residues very well disintegrated and spilled grain mixed very shallowly into the soil, so as in principle to get all oilseed plant seeds to germinate. This is particularly important with plant breeding with hybrid varieties. One wishes to remove all seeds so that they do not remain in the soil, before then germinating and contaminating later sown crops.

Another new type of implement or toolbar existing on the market is a so-called knife roller (see for examples SE 535 710). This rolling implement with sharp hardened blades is effective in threshing out seeds that are still held in seed pods and in breaking up standing stubble and lying straws. However, it has a limited ability to force its way down into the soil and carry out any substantial soil cultivation. This implement can have problems with following the irregularities of the soil. There is therefore a need for a machine comprising work members with discs and also work members with knives in order to perform satisfactory work in different conditions with different types of harvest residues and different soil types.

OBJECT OF THE INVENTION

The object of the invention is to provide a disc device for an agricultural machine that eliminates the abovementioned problems and at the same time gives good breakdown of stubble, straw and other harvest residues.

SUMMARY OF THE INVENTION

The object has been achieved through a disc device according to the characterising portion of claim 1.

The sub-claims describe advantageous embodiments of the device according to the invention.

Through the disc device according to the invention a single work member can be developed that can be used to cultivate the soil more or less like an obliquely positioned disc and to break up stubble, straw residues and other harvest residues and bury the seed at shallow depth. The present invention refers to such a disc device for an agricultural machine comprising a tool which can perform the work of a slicing disc as well as the work of a knife roller.

The disc device according to the invention comprises a disc element, which is slit up at intended places along its outer edge (periphery), whereafter the thus formed individual parts are twisted so that the former periphery forms knives distributed at mainly equal distance from each other along the formed circumference of the disc implement. The twisting of the disc implement's protruding parts amounts in a preferred embodiment to approx. 60 degrees in relation to the plane of the disc. The disc implement is assembled in known way at an arm with a rubber cushion-provided bearing, which is fastened at a frame beam on the agricultural machine, so that a machine with at least one row of discs shaped thus provides the advantages described above.

The disc implement can also be easily and effectively pressed into the desired shape, possibly in heated condition, and possibly hardened. This means that the disc can be manufactured very cost-effectively in large numbers. The same outcome can be achieved but probably at higher cost if the 'protruding parts' are welded in the desired angle at a disc/hub.

In the preferred embodiment described below the parts have been twisted approx. 60 degrees in relation to the plane of the disc, which can be a suitable angle of twisting in many conditions. The effect is that the tool efficiently disintegrates harvest residues and at the same time performs relatively intensive but shallow soil cultivation, naturally depending on the working depth to which the implement has been set. The twisting of the outer edge of the protruding parts should lie in the range 15-75 degrees in relation to the plane of the disc. In many cases a twisting of between 40-70 degrees should be suitable.

According to the invention at least one row, preferably two rows of disc devices are fastened at the frame of the agricultural machine. The suspension is springably recoilable and the depth is preferably adjustable by hydraulic means. The agricultural machine can also in the lateral direction be divided up into suitable sections so as to follow the irregularities of the soil. The device according to the invention solves the described problem with shallow cultivation and mixing of soil and harvest residues in an effective way. The farmer can thus till down and disintegrate stubble and straw and cultivate the soil.

DRAWINGS SUMMARY

The invention is described in more detail below with reference to the attached drawings, which show a preferred embodiment.

DESCRIPTION OF A PREFERRED EMBODIMENT

Figure 1:
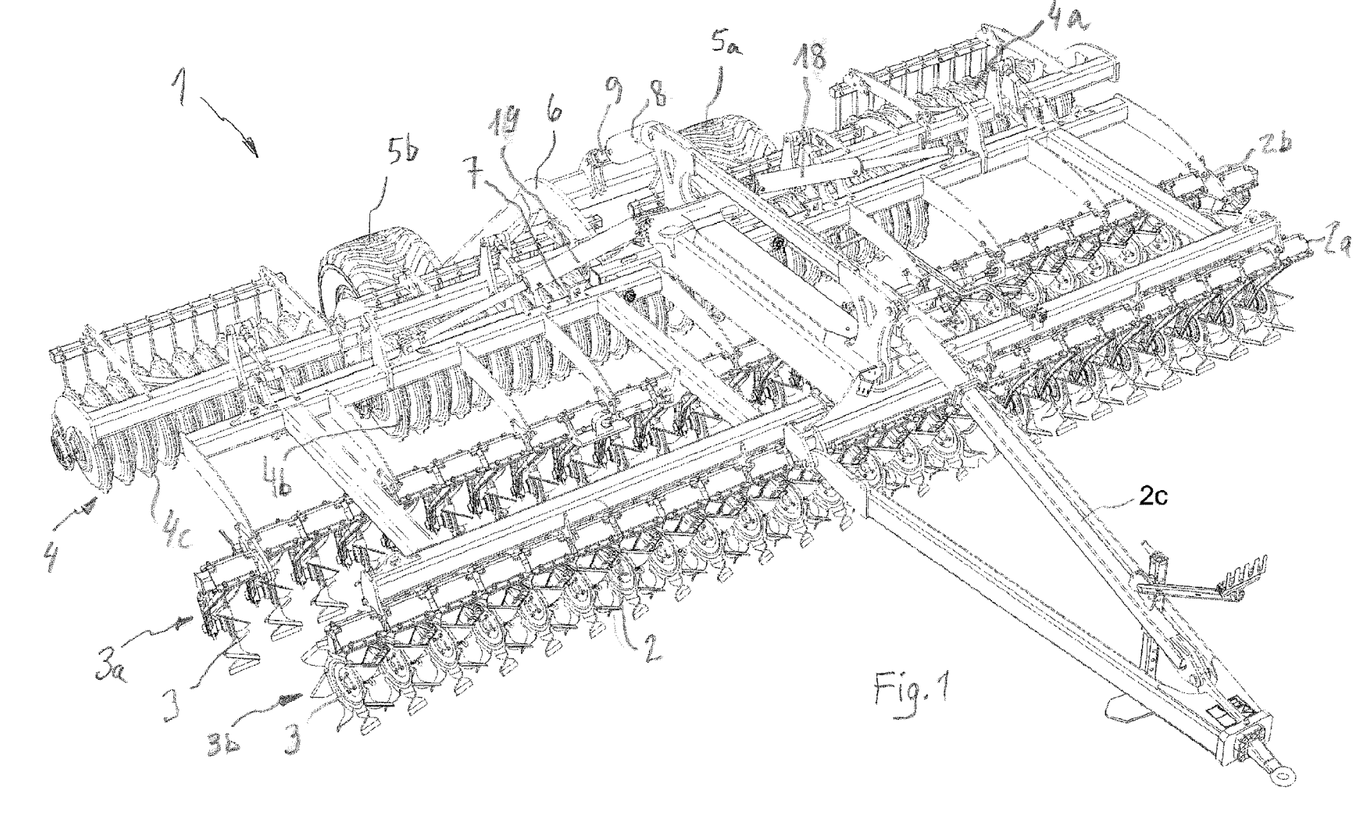
FIG. 1 shows a perspective view from the front of an agricultural machine with two rows of disc devices according to the present invention.

FIG. 1 shows an agricultural machine 1 with a frame 2 and arranged on the frame a tow device 2c, which can be coupled to a draught vehicle, such as a not shown tractor. On the frame, disc devices 3 according to the invention are arranged along two rows 3a and 3b. Along each row 3a, 3b of disc devices these are fastened with a rubber journalled fastening 13 (see description below referring to FIGS. 4-6) at respective beams 2a and 2b on the frame 2. The disc devices 3 along each beam 2a, 2b are turned in opposite directions in order to achieve a uniformly cultivated soil, as is best seen in FIG. 3.

Figure 2:
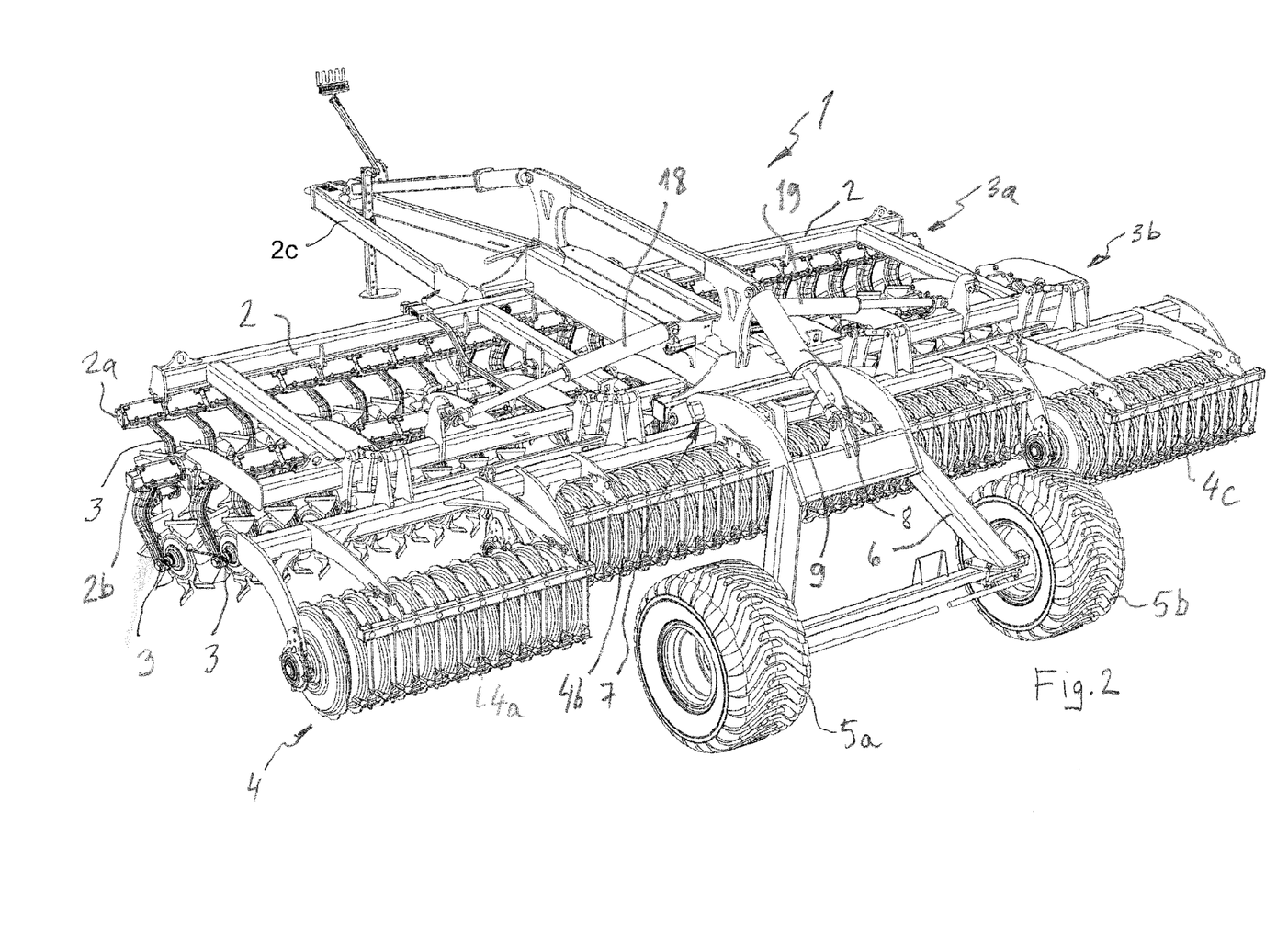
FIG. 2 shows a perspective view from the back of the agricultural machine in FIG. 1.

Behind the two rows 3a, 3b of disc devices 3 a roller assembly 4 is arranged. As can be seen in FIGS. 1-3 the roller assembly 4 is divided into three, relative to the driving direction transversely arranged parts 4a, 4b, 4c (see especially FIG. 3). Behind the roller assembly 4 are assembled transport wheels 5a and 5b, which are journalled in bearings in a frame construction 6, which in its turn is journalled in bearings at 7 in the frame 2.

The wheels 5a, 5b can be raised and lowered by means of a piston and cylinder assembly 8 in order to move the agricultural machine 1 between a transport position and a working position. As can best be seen in FIG. 2 the agricultural machine 1 in FIGS. 1-3 is disposed in the working position with the piston 9 in the piston and cylinder assembly 8 in a depressed position.

Figure 3:
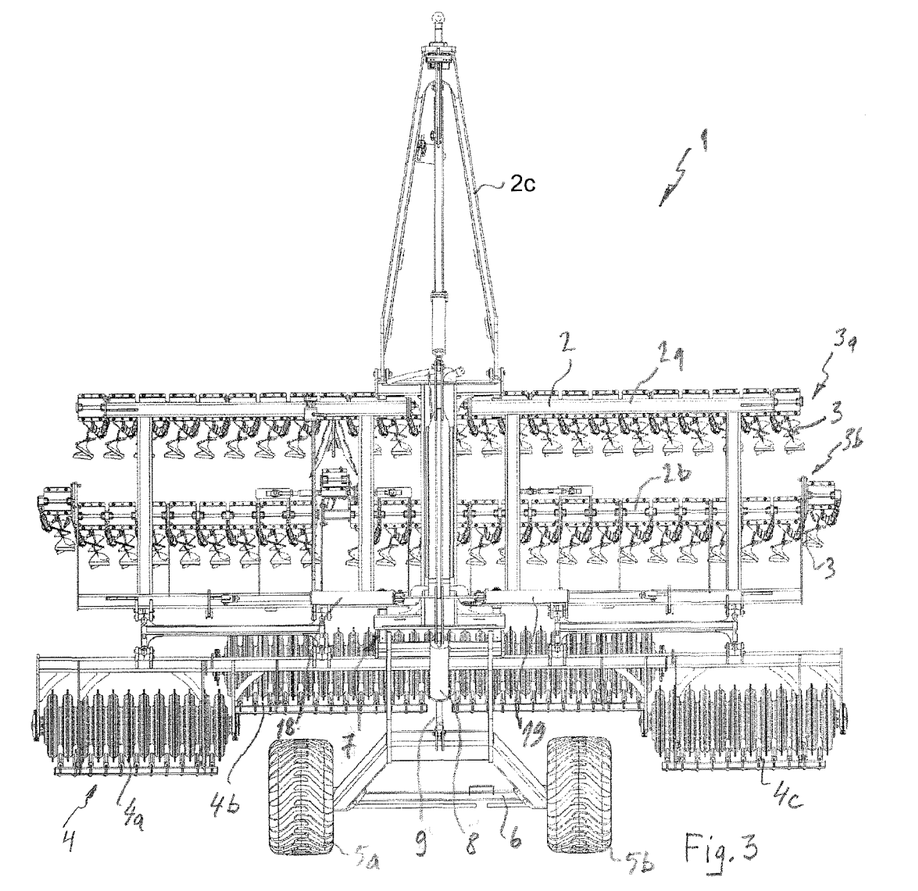
FIG. 3 shows a planar view of the agricultural machine in FIGS. 1 and 2.
Figure 4:
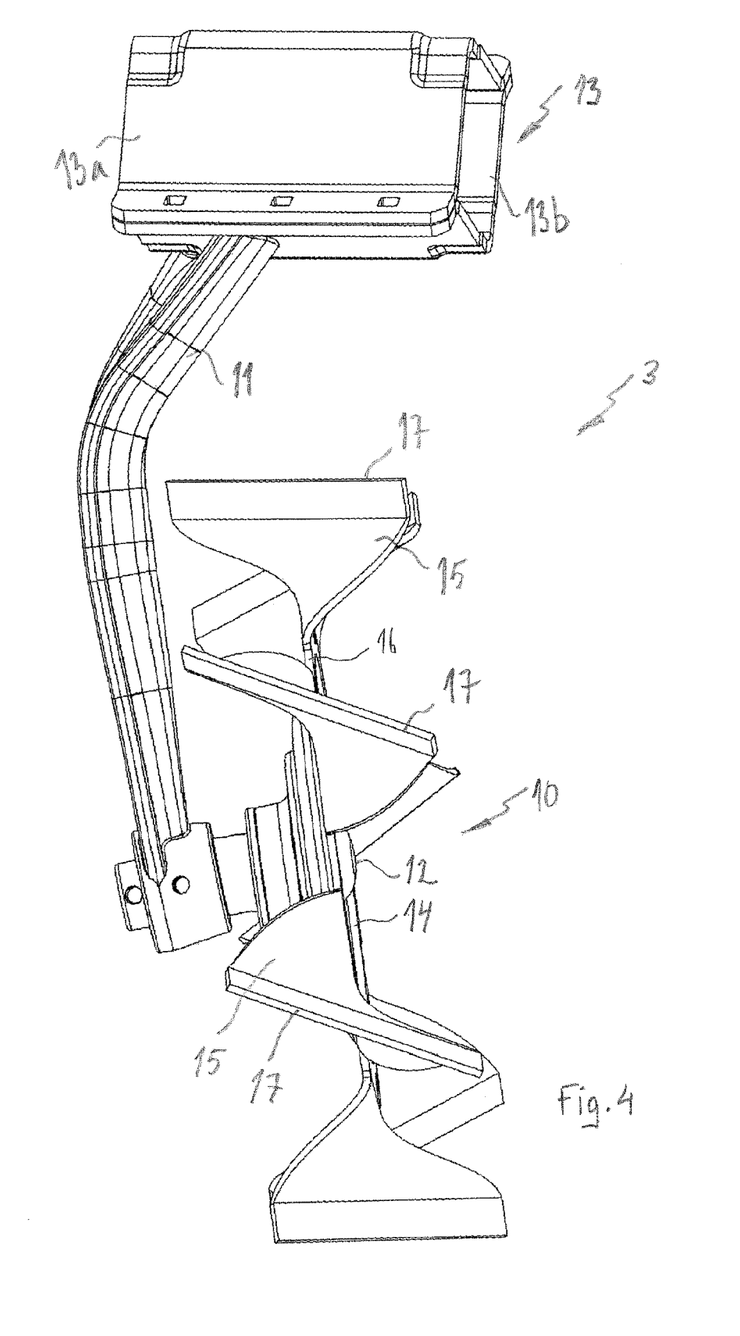
FIG. 4 shows a side view on larger scale of the disc device according to the present invention.
Figure 5:
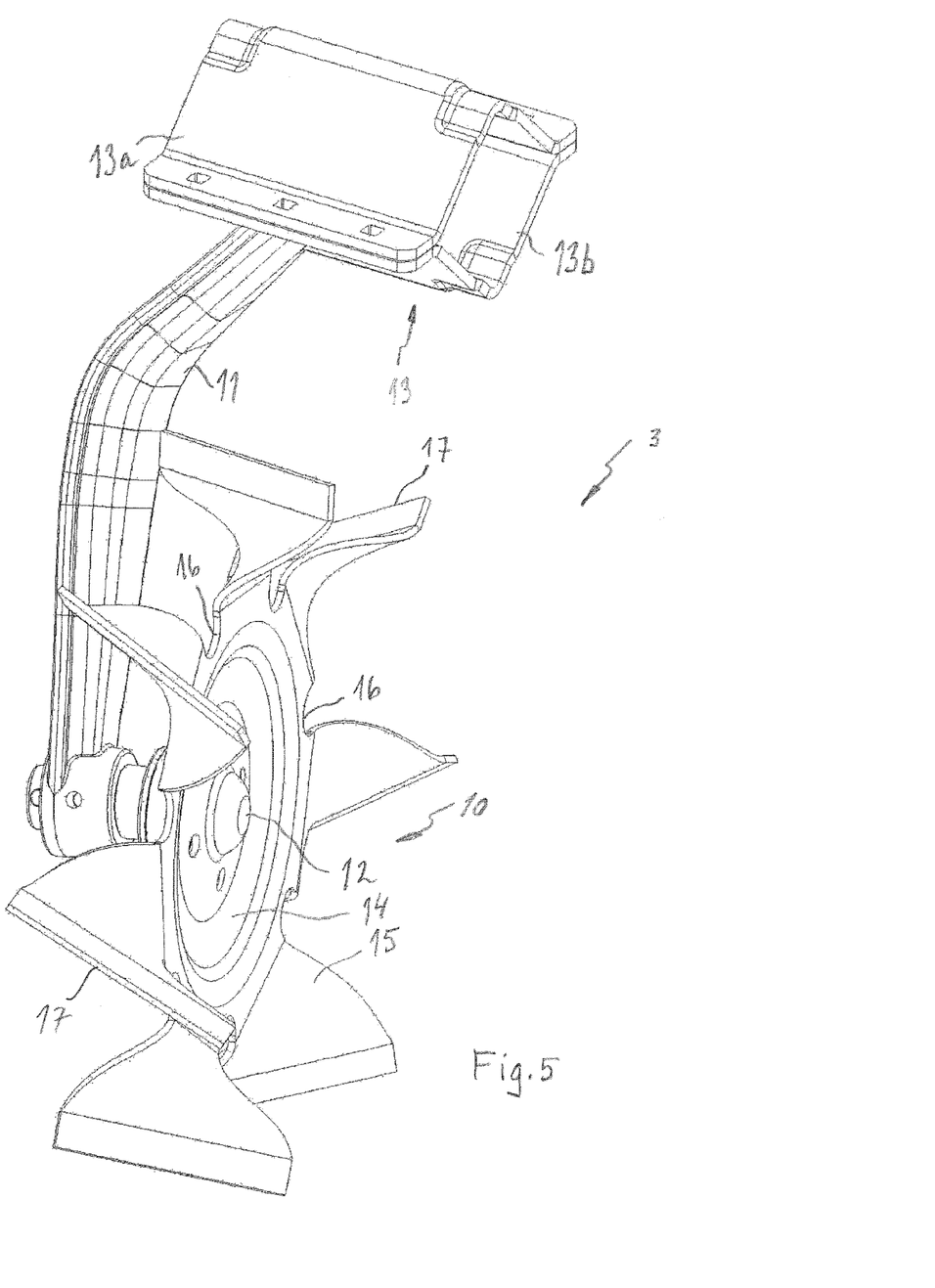
FIG. 5 shows a perspective view on larger scale of the disc device.
Figure 6:
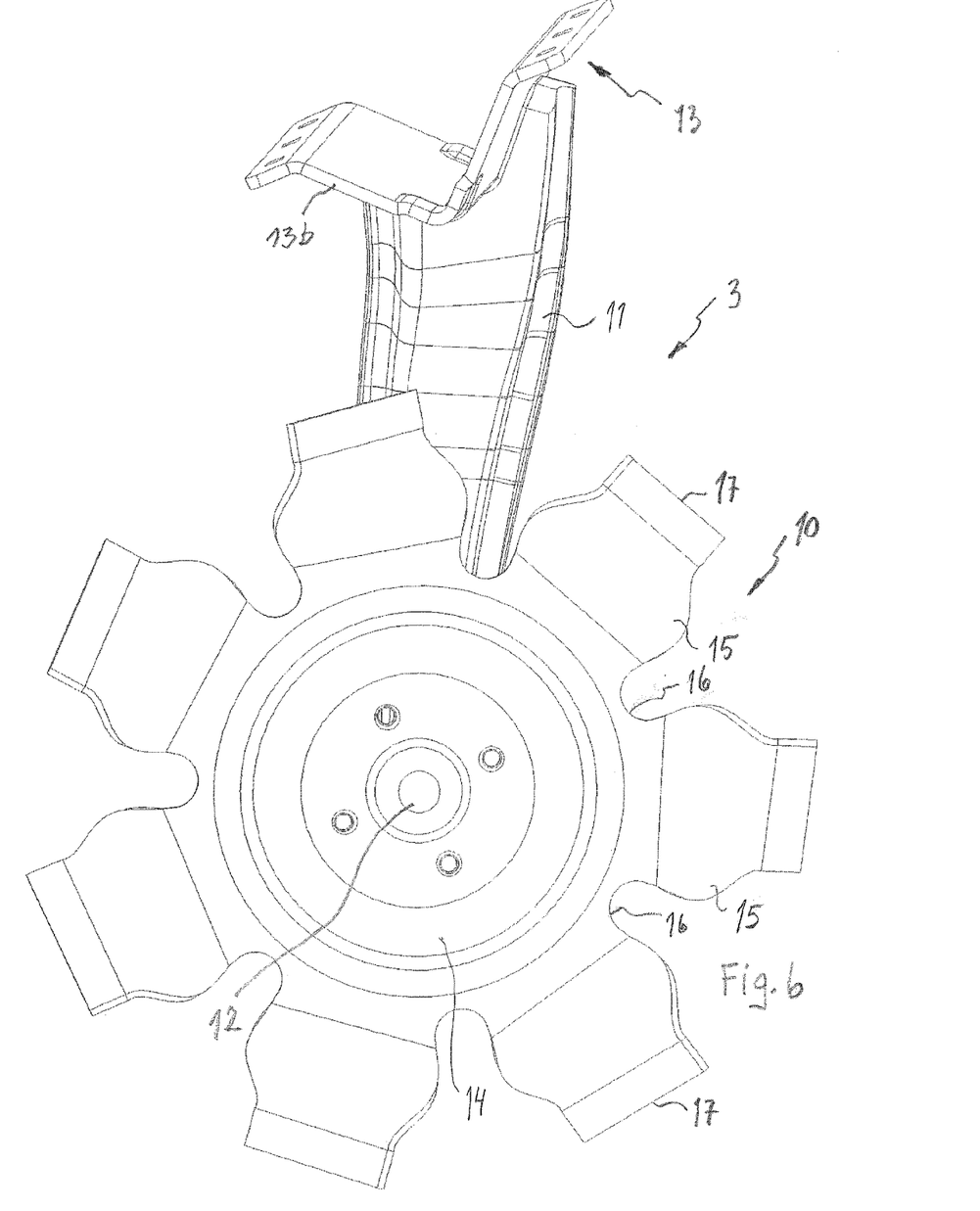
FIG. 6 shows a side view on larger scale of the disc device.

FIGS. 4-6 show a preferred embodiment of the disc device 3 according to the invention which comprises a disc implement 10, which is constituted of a not shown disc element, an arm 11, at one end of which the implement 10 is journalled in bearings at an axle 12, and a bearing 13, which is arranged at the opposite end of the arm 11 and which is adapted to be fastened at a transverse beam on the frame 2 of the agricultural machine 1 (see beams 2a and 2b in FIGS. 1-3). The disc element has been cut up inwards from its outer edge (periphery) towards and up to its hub portion 14 at mainly equally distributed places in the circumference direction of the disc element, so that freestanding, out towards the periphery radially extending, protruding parts 15 have been created. With the shown embodiment of the disc device 3 according to the invention the disc implement 10 has been cut in this way at seven places, so that a radius 16 has been formed between each of the seven protruding parts 15. The outer edges 17 of the thereby arranged parts 15 radially protruding from the portion 14 of the disc implement 10 have been twisted mainly 60 degrees to finally adopt the shape which can be seen in FIGS. 1-6. The protruding parts 15 can then have a helical shape. The disc implement 10 is assembled in known way at a frame beam 2a, 2b by means of the bearing 13 with its not shown rubber cushioning. FIGS. 4 and 5 show the upper, detachable bearing half 13a and the bearing's 13 bearing half 13b connected with the arm 11, while in FIG. 6 only the bearing half 13b is shown. With a not shown embodiment of the disc device 3 according to the invention two or more disc implements 10 can be journalled in bearings at a single arm or two arms 15 arranged in parallel can carry a plurality of disc implements 10.

The twisting of the individual, protruding parts is as stated above preferably 60 degrees, but can suitably lie in the area 15-75 degrees and more precisely in the range 40-70 degrees in relation to the plane of the disc implement 10. The plane of the disc implement 3 is defined as the plane that lies perpendicular to the axis of rotation of the axle 12 of the disc implement. An agricultural machine 1 with disc devices 3 according to the invention can, depending on conditions and construction, also carry out the work of a soil cultivator in pure soil, i.e. it can function in a multitude of different conditions.

FIGS. 1-6 show disc implements 3 each with seven radially protruding parts 15, but the number of protruding parts can naturally be varied depending on working conditions and the requirements of the agricultural machine.

The frame 2 of the agricultural machine 1 is also divided up transversely into two side sections, arranged in the lateral direction to the driving direction, in order to follow the irregularities of the soil and in order to be able to be folded up to the transport position by means of hydraulic piston and cylinder assemblies 18 and 19 together with the outer sections 4a, 4c of the roller assembly 4.

The bearing 13 with not shown rubber cushioning provides the possibility to exert a considerable downward force on the disc devices 3. The disc devices 3 have despite this force the possibility to move in the vertical direction under load so as to adapt themselves to the irregularities of the soil and to spring up if the field has fixed obstacles, for example in the form of large stones.

The invention can be varied in a plurality of ways within the frame of the attached claims, although the above-described embodiment is to be preferred.

The invention claimed is:

1. A disc device for an agricultural machine intended to carry out the work of a slicing disc and the work of a knife roller, wherein the disc device comprises:
    at least one disc implement;
    an arm, at one end of which the at least one disc implement is journalled in bearings at an axle; and
    a bearing portion arranged at an opposite end of the arm and adapted to be fastened at a transverse beam on a frame of the agricultural machine,
    wherein the disc device comprises in the circumference direction of the at least one disc implement substantially equally distributed, freestanding, out towards the periphery radially extending, protruding parts, each protruding part being twisted into a helical shape in which a substantially straight outer edge extends in a range of 15-75 degrees in relation to a plane of the at least one disc implement that lies perpendicular to an axis of rotation of the axle of the at least one disc implement, and
    wherein all the protruding parts, including directly adjacent protruding parts provided without a protruding part therebetween, on the at least one disc implement are twisted in the same direction.

2. The disc device according to claim 1, wherein the edge of each protruding part has been twisted 40-70 degrees in relation to the plane of the at least one disc implement.

3. The disc device according to claim 1, wherein the at least one disc implement has been divided up inwards from an outer edge (periphery) thereof towards and up to a hub portion thereof at substantially equally distributed places in a circumference direction.

4. The disc device according to claim 1, wherein between each protruding part is arranged a slit, wherein an inner end of the slit is rounded off with a radius.

5. The disc device according to claim 1, wherein each outer edge has a rim at a part of the protruding part that is intended to make contact with the soil.

6. A method of manufacturing the disc device according to claim 1, comprising the steps of:
    shaping the disc element of the at least one disc implement;
    cutting the disc element up inwards from an outer periphery thereof towards and up to a hub portion thereof at substantially equally distributed places in a circumference direction of the disc element, so that freestanding, out towards the periphery radially extending, protruding parts are created; and
    twisting the substantially straight outer edge of each protruding part, so that the substantially straight outer edge extends in a range of 15-75 degrees in relation to a plane of the at least one disc implement, wherein all the protruding parts, including directly adjacent protruding parts provided without a protruding part therebetween, on the at least one disc implement are twisted in the same direction.

7. The method according to claim 6, wherein each protruding part is twisted so that the edge of the protruding part extends 40-70 degrees in relation to the plane of the at least one disc implement, and wherein a radius is created at the inner end of a slit formed between each protruding part.

8. An agricultural machine comprising at least one row of the disc devices according to claim 1.

9. The disc device according to claim 1, wherein the edge of each protruding part has been twisted 60 degrees in relation to the plane of the at least one disc implement.

10. The method according to claim 6, wherein each protruding part is twisted so that the edge of the protruding part extends 60 degrees in relation to the plane of the at least one disc implement.

11. The disc device according to claim 2, wherein the at least one disc implement has been divided up inwards from an outer edge (periphery) thereof towards and up to a hub portion thereof at substantially equally distributed places in a circumference direction so that each part forms a helical shape.

12. The disc device according to claim 2, wherein between each protruding part is arranged a slit, wherein an inner end of the slit is rounded off with a radius.

13. The disc device according to claim 3, wherein between each protruding part is arranged a slit, wherein an inner end of the slit is rounded off with a radius.

14. The disc device according to claim 2, wherein each outer edge has a rim at a part of the protruding part that is intended to make contact with the soil.

15. The disc device according to claim 3, wherein each outer edge has a rim at a part of the protruding part that is intended to make contact with the soil.

16. The disc device according to claim 4, wherein each outer edge has a rim at a part of the protruding part that is intended to make contact with the soil.

17. A method of manufacturing the disc device according to claim 2, comprising the steps of:

shaping the disc element of the at least one disc implement;

cutting the disc element up inwards from an outer periphery thereof towards and up to a hub portion thereof at substantially equally distributed places in a circumference direction of the disc element, so that freestanding, out towards the periphery radially extending, protruding parts are created; and twisting the substantially straight outer edge of each protruding part, so that the substantially straight outer edge extends in a range 40-70 degrees in relation to a plane of the at least one disc implement.

18. A method of manufacturing the disc device according to claim 3, comprising the steps of:

shaping the disc element of the at least one disc implement;

cutting the disc element up inwards from an outer periphery thereof towards and up to a hub portion thereof at substantially equally distributed places in a circumference direction of the disc element, so that freestanding, out towards the periphery radially extending, protruding parts are created; and twisting the substantially straight outer edge of each protruding part, so that the substantially straight outer edge extends in a range of 15-75 degrees in relation to a plane of the at least one disc implement.

* * * * *